(12) United States Patent
Capstran et al.

(10) Patent No.: US 7,818,867 B1
(45) Date of Patent: Oct. 26, 2010

(54) METHOD OF TREATING A HOLE SAW TO PROVIDE EFFICIENT SLUG REMOVAL

(76) Inventors: Richard E. Capstran, 1840 N. Prospect Ave., #516, Milwaukee, WI (US) 53202; Mirko Buzdum, N7221 Maple Ridge Rd., Oconomowoc, WI (US) 53066

(*) Notice: Subject to any disclaimer, the term of this patent is extended or adjusted under 35 U.S.C. 154(b) by 0 days.

(21) Appl. No.: 12/684,196

(22) Filed: Jan. 8, 2010

Related U.S. Application Data

(63) Continuation-in-part of application No. 12/473,062, filed on May 27, 2009, now abandoned.

(51) Int. Cl.
B23B 51/04 (2006.01)

(52) U.S. Cl. ............... 29/458; 408/68; 408/206; 408/703; 427/384; 427/388.1

(58) Field of Classification Search ............... 29/458; 408/68, 204, 206, 703; 427/384, 388.1; B23B 51/04, B23B 51/05; B23P 25/00
See application file for complete search history.

(56) References Cited

U.S. PATENT DOCUMENTS

| | | | | |
|---|---|---|---|---|
| 146,901 | A * | 1/1874 | Harrison et al. | 127/30 |
| 308,842 | A * | 12/1884 | Hunt | 408/86 |
| 1,234,467 | A * | 7/1917 | Hamilton | 408/68 |
| 3,265,104 | A * | 8/1966 | Gallo, Sr. | 408/68 |
| 3,390,596 | A * | 7/1968 | Trevathan | 408/68 |
| 3,870,431 | A * | 3/1975 | Luckenbill et al. | 408/111 |
| 4,207,790 | A * | 6/1980 | Endo | 83/699.11 |
| 4,406,334 | A * | 9/1983 | Baumann et al. | 175/315 |
| 4,595,321 | A * | 6/1986 | Van Dalen | 408/205 |
| 4,652,185 | A * | 3/1987 | Malrick | 408/68 |
| 4,755,087 | A * | 7/1988 | Parent | 408/68 |
| 5,120,596 | A * | 6/1992 | Yamada | 428/216 |
| 5,205,685 | A | 4/1993 | Herbert | |
| 5,366,326 | A * | 11/1994 | Converse | 408/72 B |
| 5,435,672 | A * | 7/1995 | Hall et al. | 408/68 |
| 5,667,846 | A * | 9/1997 | Thomas | 427/379 |
| 5,676,501 | A * | 10/1997 | Peetz et al. | 408/204 |
| 5,682,665 | A * | 11/1997 | Svanberg | 29/458 |
| 5,721,053 | A * | 2/1998 | Thomas | 428/422 |
| 5,789,083 | A * | 8/1998 | Thomas | 428/422 |
| 5,842,820 | A * | 12/1998 | Lee et al. | 408/204 |

(Continued)

FOREIGN PATENT DOCUMENTS

JP 2005096022 A * 4/2005

(Continued)

*Primary Examiner*—Eric A Gates
(74) *Attorney, Agent, or Firm*—Donald J. Ersler

(57) ABSTRACT

A hole saw having efficient slug removal preferably includes a saw cup, a shank portion and a pilot cutting device. A cutting surface is formed on an open end of the saw cup. The inside surface, outside surface and cutting surface of the saw cup are given a low friction treatment. A fluoropolymer resin coating is used for the low friction treatment. The friction treatment is applied by spraying thereof on the saw cup. The saw cup is then heated to a predetermined temperature for a set period of time. The low friction treatment is cured when the saw cup is used. The shank portion is attached to a closed end of the saw cup with any suitable fastening process. The shank portion preferably retains the pilot cutting device.

17 Claims, 2 Drawing Sheets

U.S. PATENT DOCUMENTS

| | | | | |
|---|---|---|---|---|
| 5,895,178 | A * | 4/1999 | Young | 409/206 |
| 5,922,468 | A * | 7/1999 | Huesmann et al. | 428/422 |
| 5,934,845 | A * | 8/1999 | Frey | 408/68 |
| 6,123,999 | A * | 9/2000 | Felix et al. | 427/449 |
| 6,206,616 | B1 * | 3/2001 | Smith et al. | 408/1 R |
| 6,599,063 | B1 * | 7/2003 | Capstran | 408/1 R |
| 6,677,044 | B2 * | 1/2004 | Araki et al. | 428/421 |
| 6,857,831 | B2 | 2/2005 | Davis | |
| 2003/0036608 | A1 * | 2/2003 | Daly et al. | 525/526 |
| 2004/0042861 | A1 * | 3/2004 | Capstran | 409/132 |
| 2005/0111926 | A9 * | 5/2005 | Cardemon et al. | 408/1 R |
| 2006/0199013 | A1 * | 9/2006 | Malshe et al. | 428/409 |
| 2006/0210366 | A1 * | 9/2006 | Kozak | 408/68 |
| 2006/0257220 | A1 * | 11/2006 | Gertner | 408/202 |
| 2007/0212179 | A1 * | 9/2007 | Khangar et al. | 408/204 |
| 2009/0035082 | A1 * | 2/2009 | Singh | 408/204 |
| 2009/0208302 | A1 * | 8/2009 | Durfee | 408/206 |

FOREIGN PATENT DOCUMENTS

JP        2007063650 A  *  3/2007

* cited by examiner

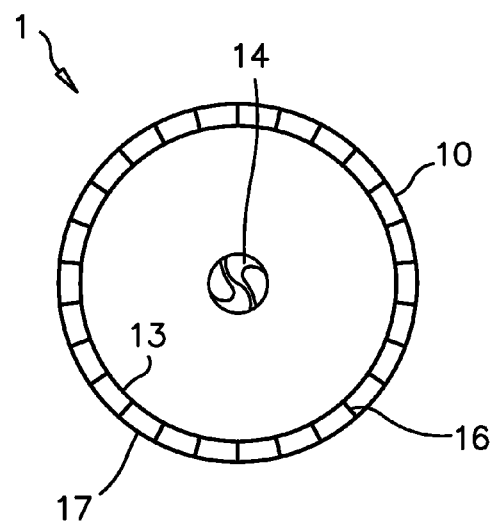
Fig. 1
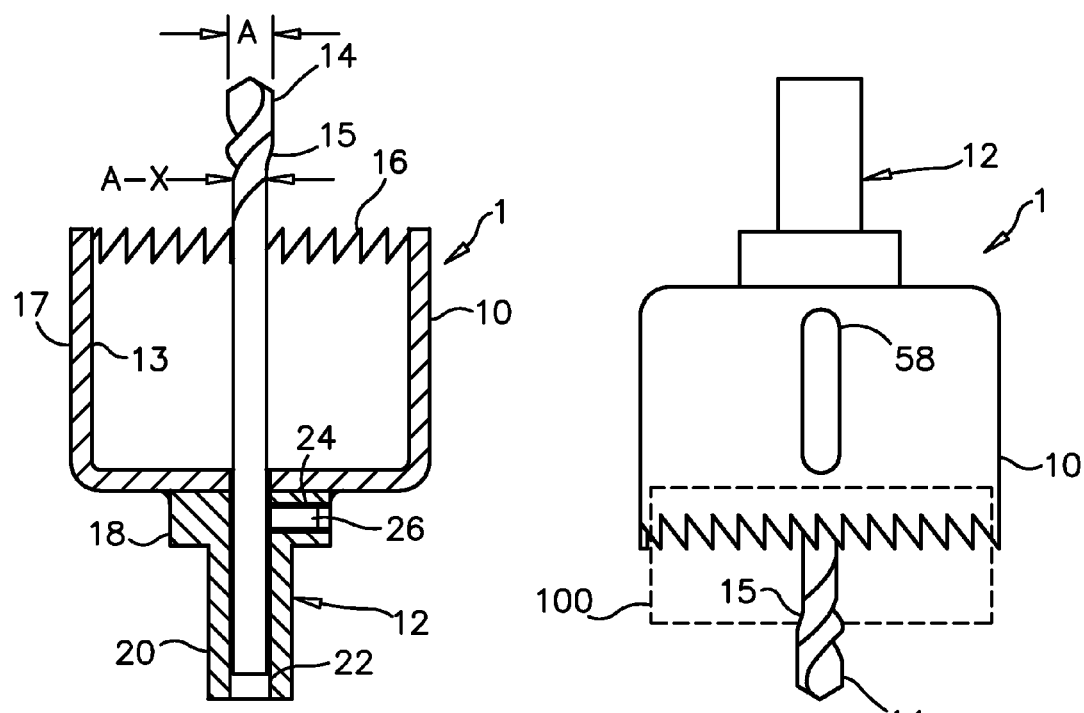
Fig. 2
Fig. 3

METHOD OF TREATING A HOLE SAW TO PROVIDE EFFICIENT SLUG REMOVAL

CROSS-REFERENCES TO RELATED APPLICATIONS

This is a continuation-in-part patent application taking priority from nonprovisional application Ser. No. 12/473,062 filed on May 27, 2009, now abandoned which takes priority from nonprovisional application Ser. No. 11/832,970 filed on Aug. 2, 2007, which takes priority from nonprovisional application Ser. No. 11/511,709 filed on Aug. 29, 2006.

BACKGROUND OF THE INVENTION

1. Field of the Invention

The present invention relates generally to hole saws and more specifically to a method of treating a hole saw to provide efficient slug removal, which allows a slug to be removed from the hole saw without the use of additional tools.

2. Discussion of the Prior Art

The most common type of hole saw is a cup with teeth formed on an open end, a shank attached to the other end of the cup, and a drill retained in the shank. The drill starts the hole cutting process by providing a pivotal anchor for cutting the hole with the cup. However, an aggravating problem encountered with hole saws is the removal of a hole slug from the cup. Depending upon the material of the hole slug, removal of the slug can be a major challenge. If the material is plastic, the plastic hole slug will heat bond to the inside surface of the cup. There are numerous solutions proposed for removal of the hole slug. The simplest method of slug removal is to form openings in the top and/or side of the hole saw to allow the slug to be pushed or pried out with a tool.

U.S. Pat. No. 5,205,685 to Herbert discloses a hole saw. The hole saw includes an annular ring surrounding a body of the hole saw. The annular ring includes a teflon coating. However, neither the cylindrical body of the hole saw or the cutting teeth are coated with teflon. U.S. Pat. No. 6,857,831 to Davis discloses an I-joist hole cutting apparatus. The cutting apparatus includes a ring and a chord. The outer surface of the ring is treated with a low friction material, such as teflon. However, the groove cutting member is not coated with teflon.

Durability of a saw cup of a hole saw may be tested by cutting a hole in metal, such as steel plate. If the temper of the hole saw cutting teeth is proper, the cutting teeth will survive forming a hole in the steel plate. If the temper of the cutting teeth is not proper, the cutting teeth will fail. It has been found that high temperature baking of a fluoropolymer resin coating spray on a saw cup will result in the temper of the cutting teeth being compromised for use on any type of material.

Accordingly, there is a clearly felt need in the art for a method of treating a hole saw to provide efficient slug removal, which includes a low friction treatment of inside and outside surfaces of the hole saw body, which has been set, but not cured by the manufacturer.

SUMMARY OF THE INVENTION

The present invention provides a hole saw having efficient slug removal that allows a hole slug to be removed therefrom without the use of tools. The hole saw having efficient slug removal preferably includes a saw cup, a shank portion and a pilot cutting device. A plurality of cutting teeth are formed on an open end of the saw cup. An inside surface of the saw cup extending from a tip of the cutting teeth to substantially a closed end of the saw cup is given a low friction treatment. An outside surface of the saw cup extending from a tip of the cutting teeth to substantially the closed end of the saw cup is also preferably given a low friction treatment. The low friction treatment is sprayed on the inside and outside surfaces of the saw cup. The saw cup is then set by heating thereof to a predetermined temperature for a period of time to make the low friction coating adhere to the surface of the saw cup.

The shank portion is attached to the other end of the saw cup with any suitable fastening process. The pilot cutting device is preferably a drill, but other cutting devices may also be used. A shank opening is formed through the shank portion to receive the shank of the pilot cutting device. Preferably, a threaded fastener, such as a set screw is used to retain the pilot cutting device in the shank opening. A compression spring may be retained in the shank portion to provide extra help to remove a slug. A contact disc may be placed between the pilot cutting device and the compression spring to evenly distribute force from the compression spring against the slug.

Accordingly, it is an object of the present invention to provide a method of treating a hole saw to provide efficient slug removal, which includes a low friction treatment of inside and outside surfaces of the hole saw body, which has been set, but not cured by the manufacturer.

These and additional objects, advantages, features and benefits of the present invention will become apparent from the following specification.

BRIEF DESCRIPTION OF THE DRAWINGS

FIG. 1 is a bottom end view of a hole saw having efficient slug removal in accordance with the present invention.

FIG. 2 is a side cross sectional view of a hole saw having efficient slug removal in accordance with the present invention.

FIG. 3 is a side view of a hole saw having efficient slug removal in accordance with the present invention.

DETAILED DESCRIPTION OF THE PREFERRED EMBODIMENTS

Figure 4:
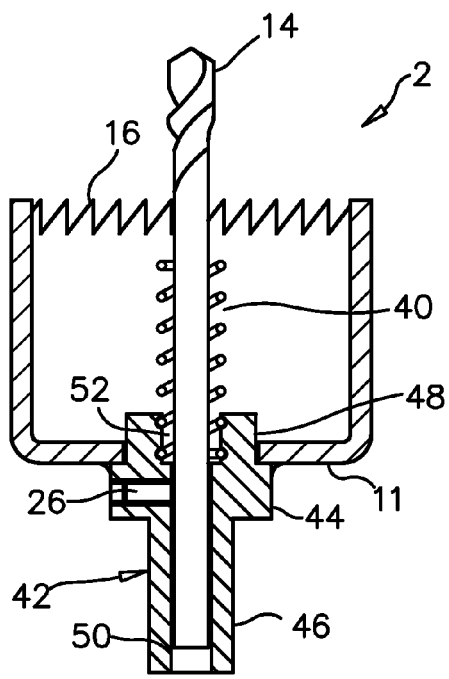
FIG. 4 is a side cross sectional view of a hole saw having efficient slug removal with a compression spring in accordance with the present invention.

With reference now to the drawings, and particularly to FIG. 1, there is shown a bottom end view of a hole saw having efficient slug removal 1. With reference to FIG. 2, the hole saw having efficient slug removal 1 includes a saw cup 10, a shank portion 12 and a pilot cutting device, such as a location drill 14. The shank portion 12 is attached to a closed end of the saw cup 10 with any suitable fastening process, such as welding. A plurality of cutting teeth 16 are formed on an open end of the saw cup 10.

An inside surface 13 of the saw cup 10 extending from a tip of the cutting teeth 16 to substantially the closed end of the saw cup 10 is given a low friction treatment. An outside surface 17 of the saw cup 10 extending from a tip of the cutting teeth 16 to substantially a closed end of the saw cup 10 is also preferably given a low friction treatment. The low friction treatment preferably includes applying a low friction coating to a surface and setting the low friction coating on the surface at a predetermined temperature.

The following parameters are given by way of example and not by way of limitation. Satisfactory hole cutting results have been found when the inside and outside surfaces of the saw cup including the cutting teeth are treated with a fluoropolymer (low friction) coating, Polytetrafluoroethylene (PTFE). However, other types of fluoropolymer besides PTFE may also be used. The improved results were found by the nonobvious step of disregarding the PTFE's manufacturer's instructions for curing the PTFE on the saw cup 10 and cutting teeth 16. The manufacturer's directions calls for baking the PTFE coating on the saw cup 10 at temperatures in excess of 500 degrees Fahrenheit (F). The baking temperature in excess of 500 degrees F. results in a loss of temper in the cutting teeth 16, with the result that the cutting teeth 16 fail when cutting a hole in any type of material.

The PTFE is applied to the saw cup 10 (including the cutting teeth 16) in the following manner. The cutting teeth 16 may also be fabricated from a different material than the saw cup 10, such as high speed steel or carbide and welded to a top of the saw cup 10. The surfaces of the saw cup 10 to be treated with PTFE are first degreased with a solvent cleaner. A coat of the PTFE is sprayed on the inside surface, outside surface and cutting teeth 16 of the saw cup 10. The saw cup 10 is preferably placed in an oven for between 8-12 minutes at a temperature of no greater than about 250 degrees F. The coat of the PTFE has a preferable dry film thickness of between 12-20 microns. The heating of the saw cup 10 makes the fluoropolymer on the saw cup 10 set or adhere thereto.

The curing or molecular cross-linking of the fluoropolymer to the saw cup 10 has the unexpected result of occurring when the saw cup 10 is used over its life time to make holes in objects. The predetermined temperature during use cures the fluoropolymer to the saw cup 10. Otherwise setting and curing as directed by the manufacturer will result in the cutting teeth 16 losing their temper and becoming nearly useless. The low friction fluoropolymer coating has durability and abrasion resistance that will last at least as long as the useable sharpness of the cutting teeth 16 and/or the temper of the cutting teeth 16.

The PTFE treatment reduces heat and thermal expansion of the saw cup 10 during use. The PTFE treatment reduces further friction caused by expansion of the saw cup 10 during use. The saw cup 10 treated with PTFE is noticeably cooler to the touch than an untreated saw cup 10. The PTFE also increases the life of the saw cup 10.

The shank portion 12 preferably includes a fastening portion 18 and a chuck shank 20. A drill opening 22 is formed through the fastening portion 18 and the chuck shank 20 to receive the location drill 14. A female thread 24 is preferably formed through the fastening portion 18 to the drill opening 22. A threaded fastener 26 (such as a set screw) is threaded into the female thread 24 and tightened against the location drill 14 to retain thereof relative to the shank portion 12. However, other designs of shank portions may also be used.

The location drill 14 is preferably modified such that the cutting diameter "A" has a short length and the remainder of the length is relieved, such that the remainder of the length (shank) has a diameter "A-X," which is smaller in diameter than the cutting diameter "A." The value of "X" is preferably at least 0.015 inches. Preferably, the transition from the cutting diameter "A" to the relieved diameter "A-X" is implemented with a straight taper of 10 degrees from the axis of the drill. However, other values and transition shapes besides the 10 degree straight taper may also be used.

With reference to FIG. 3, when the hole saw 1 is oriented such that the open end of the saw cup 10 is facing downward, a slug 100 drops, until thereof contacts a bottom of the cutting diameter edge 15 of the location drill 14. The slug 100 may be removed from the location drill 14 by hand. Sometimes the slug 100 will fall off the location drill 14. For some materials and hole saw sizes, a relieved location drill 14 is not necessary to aid removal of a slug 100; the slug 100 will drop off the location drill 14.

With reference to FIG. 4, a compression spring 40 is added to a hole saw 2 to eject a slug, when the open end is facing upward. The compression spring 40 may be retained by creating a spring shank portion 42. The spring shank portion 42 includes a fastening portion 44, a chuck shank 46, and a spring retainer 48. A drill opening 50 is formed through the fastening portion 44 and the chuck shank 46 to receive the location drill 14. Preferably, a threaded fastener 26 (such as a set screw) is tightened against the location drill 14 to retain thereof relative to the saw cup 11. A clearance hole is formed through a top of the saw cup 11 to receive the spring retainer 48. A spring tap 52 is formed in the spring retainer 48 to threadably receive the compression spring 40. Preferably, the compression spring 40 is wound in a direction opposite the rotation of the hole saw 2, such that rotation of the hole saw 2 causes the compression spring 40 to thread into the spring tap 52. However, other methods of retaining a bottom of the compression spring 40 against a top of the saw cup 11 may also be used, such as welding, adhesive, or retention tabs on the saw cup 11, which capture a bottom of the compression spring 40.

Figure 5:
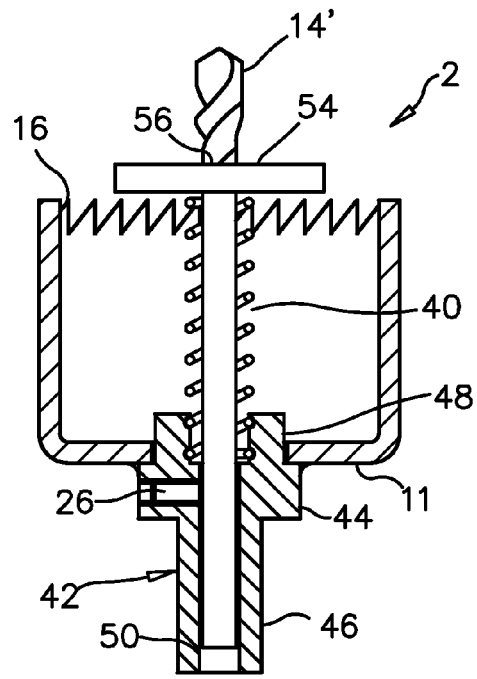
FIG. 5 is a side cross sectional view of a hole saw having efficient slug removal with a compression spring and contact disc in accordance with the present invention.

With reference to FIG. 5, a contact disc 54 is placed between a location drill 14' and the compression spring 40 to evenly distribute force from the compression spring against the slug. It is preferable to give one face of the contact disc 54 a low friction treatment to minimize friction between the slug 100 and the contact disc 54. The low friction treatment is preferably the same as that applied to the saw cup 10, 11. A transition from a cutting diameter "A" to a shank diameter is made with a square bottom edge 56 instead of the tapered cutting diameter edge 15 of the location drill 14. The square bottom edge 56 retains the contact disc 54 from traveling-up the cutting diameter "A".

Figure 6:
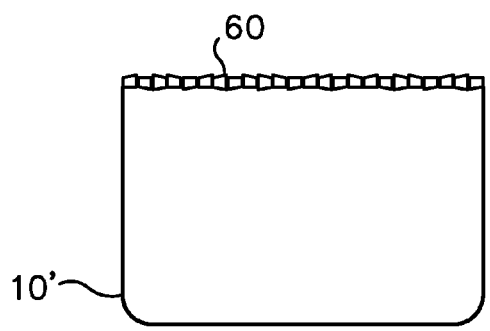
FIG. 6 is a side view of a saw cup with an abrasive cutting surface of a hole saw having efficient slug removal in accordance with the present invention.

With reference to FIG. 3, at least one removal slot 58 may be formed in a side and/or top of the saw cup 10, 11 to provide clearance for a tool (such as a screw driver), which would be used to help remove a slug from the saw cup 10, 11, if the need should arise. Other openings in the side and top of the saw cup 10, 11 may also be formed for helping the removal of an occasional stuck slug. FIG. 6 shows that the cutting teeth 16 have been replaced with an abrasive cutting surface 60 on the saw cup 10'. Other suitable cutting surfaces may also be used besides the cutting teeth 16 and the abrasive cutting surface 60.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A method of treating a saw cup of a hole saw to provide efficient slug removal, comprising the steps of: providing a saw cup having a closed end, an open end, an inside surface and an outside surface; and forming a cutting surface on said open end of said saw cup; applying at least one coat of fluoropolymer resin to said inside surface, said outside surface and said cutting surface; and heating said fluoropolymer resin to a temperature of no greater than about 250 degrees Fahrenheit, further comprising the step of: providing said fluoropolymer resin with durability and abrasion resistance that lasts at least as long as the sharpness of said cutting surface or the temper of said cutting surface.

2. The method of treating a saw cup of a hole saw to provide efficient slug removal of claim 1, further comprising the step of:
providing PTFE for said fluoropolymer resin.

3. The method of treating a saw cup of a hole saw to provide efficient slug removal of claim 1, further comprising the step of:
providing a plurality of cutting teeth for said cutting surface.

4. The method of treating a saw cup of a hole saw to provide efficient slug removal of claim 1, further comprising the step of:
attaching a shank portion to said closed end of said saw cup.

5. The method of treating a saw cup of a hole saw to provide efficient slug removal of claim 4, further comprising the step of:
extending a pilot cutting device from said shank portion.

6. A method of treating a saw cup of a hole saw to provide efficient slug removal, comprising the steps of: providing a saw cup having a closed end, an open end, an inside surface and an outside surface; and forming a cutting surface on said open end of said saw cup; applying at least one coat of fluoropolymer resin to said inside surface, said outside surface and said cutting surface; and heating said fluoropolymer resin to a temperature of no greater than about 250 degrees Fahrenheit for period of between 8-12 minutes, further comprising the step of: providing said fluoropolymer resin with durability or abrasion resistance that lasts at least as long as the sharpness of said cutting surface or the temper of said cutting surface.

7. The method of treating a saw cup of a hole saw to provide efficient slug removal of claim 6, further comprising the step of:
providing PTFE for said fluoropolymer resin.

8. The method of treating a saw cup of a hole saw to provide efficient slug removal of claim 6, further comprising the step of:
providing a plurality of cutting teeth for said cutting surface.

9. The method of treating a saw cup of a hole saw to provide efficient slug removal of claim 6, further comprising the step of:
attaching a shank portion to said closed end of said saw cup.

10. The method of treating a saw cup of a hole saw to provide efficient slug removal of claim 9, further comprising the step of:
extending a pilot cutting device from said shank portion.

11. A method of treating a saw cup of a hole saw to provide efficient slug removal, comprising the steps of:
providing a saw cup having a closed end, an open end, an inside surface and an outside surface; and
forming a cutting surface on said open end of said saw cup;
applying at least one coat of fluoropolymer resin to said inside surface, said outside surface and said cutting surface; and
heating said fluoropolymer resin to a temperature of no greater than about 250 degrees Fahrenheit; and
curing of said fluoropolymer resin occurring during the use of said saw cup.

12. The method of treating a saw cup of a hole saw to provide efficient slug removal of claim 11, further comprising the step of:
heating said fluoropolymer resin to heat for period of between 8-12 minutes.

13. The method of treating a saw cup of a hole saw to provide efficient slug removal of claim 11, further comprising the step of:
providing PTFE for said fluoropolymer resin.

14. The method of treating a saw cup of a hole saw to provide efficient slug removal of claim 11, further comprising the step of:
providing said fluoropolymer resin with durability and abrasion resistance that lasts at least as long as the sharpness of said cutting surface or the temper of said cutting surface.

15. The method of treating a saw cup of a hole saw to provide efficient slug removal of claim 11, further comprising the step of:
providing a plurality of cutting teeth for said cutting surface.

16. The method of treating a saw cup of a hole saw to provide efficient slug removal of claim 11, further comprising the step of:
attaching a shank portion to said closed end of said saw cup.

17. The method of treating a saw cup of a hole saw to provide efficient slug removal of claim 16, further comprising the step of:
extending a pilot cutting device from said shank portion.

* * * * *